Figure 1:
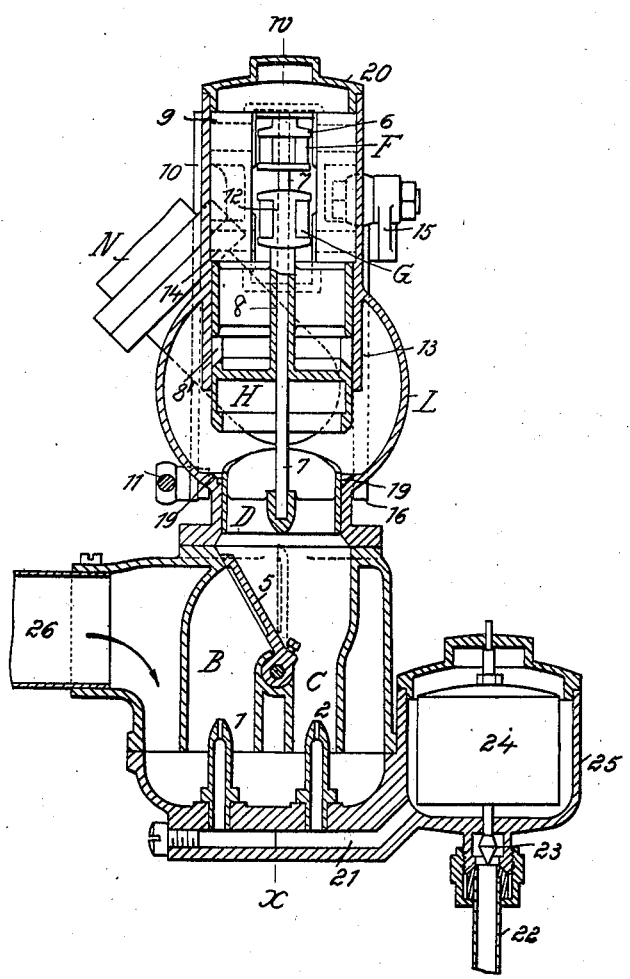

No. 861,378. PATENTED JULY 30, 1907.
H. MAYER.
SPEED REGULATING DEVICE FOR AUTOMOBILES.
APPLICATION FILED AUG. 2, 1906.

2 SHEETS—SHEET 1.

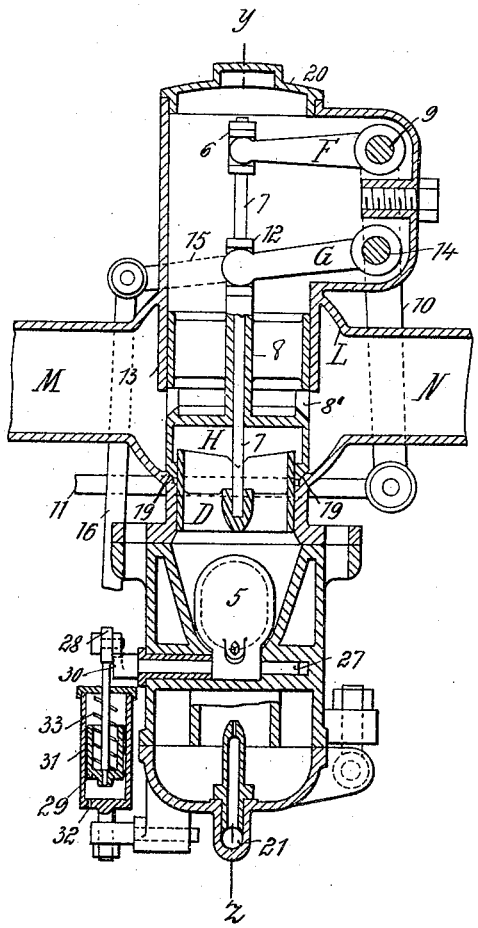

UNITED STATES PATENT OFFICE.

HEINRICH MAYER, OF ARBON, SWITZERLAND, ASSIGNOR TO THE FIRM OF ADOLPH SAURER, OF ARBON, SWITZERLAND.

SPEED-REGULATING DEVICE FOR AUTOMOBILES.

No. 861,378.      Specification of Letters Patent.      Patented July 30, 1907.

Application filed August 2, 1906. Serial No. 328,932.

*To all whom it may concern:*

Be it known that I, HEINRICH MAYER, a citizen of the Confederation of Switzerland, residing at Arbon, in Switzerland, have invented a new and useful Speed-5 Regulating Device for Automobiles, of which the following is a specification.

There are known speed regulating devices for automobiles, which are inserted between the carbureters and the explosion motors, and in which a governor of any known construction and provided either with weights or with springs is employed for regulating the speed of the motor by means of a lever and rod transmission, while a distributing piston-valve is disposed in the passage for the explosive mixture and is adapted to increase or to decrease the area in accordance with the momentary work performed by the motor. The said governor therefore served for maintaining a certain and constant number of revolutions. In practice it was found necessary to employ an additional regulator (commonly called the "accelerator") and to actuate the same by hand. This additional regulator, however, was arranged to directly influence the path or the springs of the above-said governor and therefore it produced the defect, that the automatic governor was thereby practically rendered inoperative and unsafe, at any rate it was interfered with in an objectionable manner. The consequence of this was, that with a sudden decrease of the load of the motor the latter was liable to run fast, in other words the normal speed of the motor was at once increased, unless at the same time the accelerator is so operated as to regulate the speed.

My invention relates to improvements in such speed regulating devices, whereby it is rendered possible to actuate the accelerator for increasing or decreasing at will the area for the passage of the explosive mixture for any position of the distributing piston-valve without interfering in the least with the work of the governor.

I will now proceed to describe my invention with reference to the accompanying drawing, in which—

Figure 1 is a vertical section through the line *y—z* in Fig. 2, and Fig. 2 is a vertical section at right angles thereto through the line *w—x* in Fig. 1.

Similar characters of reference refer to similar parts in both views.

The lower parts of Figs. 1 and 2 represent a carbureter with two benzin nozzles 1 and 2 for a benzin motor with one or several cylinders. The carbureter may be of any known construction, the essential point being, that a mixture of air and benzin or the like be therein formed. This carbureter is connected with a casing L, which in turn is connected by branches M and N with the inlet of the one cylinder or the inlets of the several cylinders. A known distributing piston-valve D is mounted in the lower cylindrical part of the casing L to reciprocate and is rigidly connected with a vertical spindle 7. The latter is provided at its upper end with a crosshead 6, in the two recesses of which a forked lever F engages. This lever F is by its shaft 9 rigidly connected with a lever 10, which is controlled from some governor (not shown) by means of the rod 11. The casing L is provided with an upper cylindrical part 13, in which according to my invention an "accelerating" piston-valve H is mounted to reciprocate. It is provided with a partition and with a central sleeve 8, which latter can slide up and down on the vertical spindle 7. Ports 8′ are formed in the walls of said piston valve H above the partition so that the top of the casing L will be in communication with the branches N M when the valve is in its lowermost position to prevent the formation of a vacuum in said casing. The lower edge of the piston-valve H is preferably beveled off and can rest on a corresponding seat 19 in the casing L. The internal surface of the accelerating piston-valve H at its lower edge can slide on the external surface of the upper part of the distributing piston-valve D. The sleeve 8 of the piston-valve H is connected with a crosshead 12, in the two recesses of which a forked lever G engages. The latter is by its shaft 14 rigidly connected with a lever 15 without, which can be controlled from the driver's seat by means of a rod 16 and a suitable lever and rod transmission. It will be noted, that the spindle 7 is at all times permitted to slide in the central sleeve 8 of the accelerating piston-valve H. In the uppermost position of the accelerating piston-valve H shown at Fig. 1 an annular space will be left between its lower edge and the upper edge of the piston-valve D for the passage of the explosive mixture from the carbureter to the tube M N. The said annular space corresponds to the maximum speed and full load of the motor. The upper edge of the distributing piston-valve D is preferably made to slightly slope towards the central line from two opposite sides and is provided with two opposite notches in the said central line, as is shown at Fig. 2. Thereby the area between the two opposite edges of the two piston-valves D and H is made to slowly and gradually increase at the commencement of the upward motion of the accelerating piston-valve H. When the latter occupies its lowermost position shown at Fig. 2, it will shut off the carbureter from the tube M N and the inlets of the one or several cylinders, no matter, what position the distributing piston-valve D may at the moment occupy. At the top of the casing L a cover 20 may be provided as shown.

The two nozzles 1 and 2 of the carbureter are arranged to be supplied with benzin through the common channel 21 from a supply tube 22 by means of a valve 23 under the control of a float 24 within a box 25. Air can be sucked in from without through a tube 26 in the direction of the arrow and can pass upward in the two air-passages B and C, which surround the mouths of the two nozzles 1 and 2. The one air-passage B is normally closed with a trap or clack-valve 5, which is fastened on a shaft 27 rocking in the casing and carrying an arm 28. The free end of the latter is pivotally connected with a piston 29 by means of a rod 30. The piston 29 reciprocates in a cylinder 31, which is arranged to rock on the casing and is provided in its bottom with an air-hole 32. A helical spring 33 is inserted between the piston 29 and the cover of the cylinder 31 and serves for pressing the trap or clack-valve 5 on its seat. The clack-valve 5 is arranged to be more or less opened by the draft produced from the cylinder or either of the several cylinders. This draft will suck in air from without and benzin from the nozzle 2 or both nozzles 1 and 2, as the case may be, so that an explosive mixture is produced, which passes upward through the distributing piston valve D and into the respective cylinder through the annular space between the two piston-valves D and H and through the tube M or N.

The speed regulating device is operated as follows: When the automobile with the motor and the governor is at rest, the accelerating piston-valve H will normally rest on its seat 19 and the forked lever F will occupy its lowermost position, so that the distributing piston-valve D in its lowermost position would present the largest area to the passage of the mixture, if the other piston-valve H were not there. The driver starts the motor in any known manner and brings by the respective lever and rod transmission 16, 15 the forked lever G with the accelerating piston-valve H into any intermediate position, so that the annular space between the two piston-valves H and D is produced. The governor having been meanwhile started will bring by the parts 11, 10, 9, F, 6 and 7 the distributing piston-valve more or less into the position shown at Fig. 1. The explosive mixture having been prepared in the carbureter below during the draft will be sucked in from either the passage C alone or from both passages B and C, in which case the trap or clack-valve 5 is more or less opened, and will be conducted through the distributing piston-valve D, through the annular area between both piston-valves D and H and through the branch M or N to the respective cylinder. Should it from some reason be necessary to increase or decrease the quantity of mixture admitted to the respective cylinder, the driver may by the transmission 16, 15, 14 and G raise or lower the accelerating piston-valve H respectively. The governor will during this time not be interfered with at all, so that it is permitted to adjust the distributing piston-valve D, should the speed of the motor exceed the desired speed or sink below the same. If the driver desires to gradually reduce the speed of the automobile, he may slowly lower the accelerating piston-valve H and thereby gradually diminish the annular space between the two piston-valves H and D. It will be noted, that the driver is at all times permitted to use the accelerating piston-valve H without troubling himself about the position of the governor.

The speed regulating device may be varied in many respects without deviating from the spirit of my invention.

I claim:

1. In an automobile having an explosion-motor with a governor, the combination with a carbureter adapted to produce an explosive mixture, of a casing communicating with said carbureter, connections between said casing and the explosion-motor, a tubular distributing piston-valve mounted to reciprocate in said casing, means controlled from the governor for actuating said distributing piston-valve, an accelerating piston-valve mounted to reciprocate in said casing in addition to the distributing piston-valve, said accelerating piston-valve in its one extreme position closing the distributing valve for shutting off the supply of explosive mixture, and means controlled from the driver's seat for actuating said accelerating piston-valve.

2. In an automobile having an explosion-motor with a governor, the combination with a carbureter adapted to produce an explosive mixture, of a casing having two cylindrical parts of which the lower one communicates with said carbureter, connections between said casing and the explosion-motor, a tubular distributing piston-valve mounted to reciprocate in the lower cylindrical part of said casing, means controlled from the governor for actuating said distributing piston-valve, an accelerating piston-valve open at the lower end and mounted to reciprocate in the upper cylindrical part of said casing, its lower edge being adapted to rest in the lowermost position on a seat in said casing and to encircle the upper edge of said distributing piston-valve for shutting off the supply of explosive mixture, while in any other position a space is formed between these two edges for the passage of the explosive mixture, and means controlled from the driver's seat for actuating said accelerating piston-valve.

3. In an automobile having an explosion-motor with a governor, the combination with a carbureter adapted to produce an explosive mixture, of a casing having two cylindrical parts of which the lower one communicates with said carbureter, connections between said casing and the explosion-motor, a tubular distributing piston-valve mounted to reciprocate in the lower cylindrical part of said casing, a vertical spindle connected with said distributing piston-valve, a horizontal shaft mounted in said casing to rock, an arm fastened on said horizontal shaft and pivotally connected with the upper end of said vertical spindle, a lever fastened without on said horizontal shaft, means controlled from the governor for actuating said lever, an accelerating piston-valve open at the lower end and mounted to reciprocate in the upper cylindrical part of said casing and to slide with its central sleeve on said vertical spindle, its lower edge being adapted to rest in the lowermost position on a seat in said casing and to encircle the upper edge of said distributing piston-valve for shutting off the supply of explosive mixture, while in any other position a space is formed between these two edges for the passage of the explosive mixture, a second horizontal shaft mounted in said casing to rock, a second arm fastened on said second horizontal shaft and pivotally connected with the upper end of the sleeve of said accelerating piston-valve, a second lever fastened without on said second horizontal shaft, and means controlled from the driver's seat for actuating said second lever.

4. The combination with a casing having an outlet and two superposed cylindrical parts of which the lower one can communicate with a source of fluid, a tubular distributing piston-valve mounted to reciprocate in the lower cylindrical part of said casing, a vertical spindle connected with said distributing piston-valve, means for actuating said vertical spindle, an accelerating piston-valve open at the lower end and mounted to reciprocate in the upper cylindrical part of said casing and to slide on said vertical spindle, its lower edge being adapted to rest in the lowermost position on a seat in said casing and to encircle the upper edge of said distributing piston-valve for shutting off the supply of fluid, while in any other position a space is formed between these two edges for the passage of fluid, and means for actuating said accelerating piston-valve.

HEINRICH MAYER.

Witnesses:
ANTON KUNKEL,
MARY FALCONER.